United States Patent

Guggisberg

[15] 3,650,372

[45] Mar. 21, 1972

[54] MACHINE FOR AUTOMATICALLY STACKING JOURNALS COUNTED IN PREVIOUSLY SELECTED NUMBERS

[72] Inventor: Ernst Guggisberg, Berne, Switzerland

[73] Assignee: Graphicart Internationale Ausrustungsgesell-schaft fur graphische Kunst AG, Berne, Switzerland

[22] Filed: Feb. 20, 1970

[21] Appl. No.: 12,992

[30] Foreign Application Priority Data

Feb. 28, 1969 Switzerland ..........................3145/69

[52] U.S. Cl..................................198/75, 198/40, 198/35, 93/93
[51] Int. Cl.........................................................B65g 37/00
[58] Field of Search ..............................198/40, 20, 154–158; 93/93

[56] References Cited

UNITED STATES PATENTS 3,429,239   2/1969   Murchison.............................198/154

Primary Examiner—Richard E. Aegerter
Attorney—Linton & Linton

[57] ABSTRACT

The machine has a first horizontal conveyor belt for all the copies pressed at the fold to the same thickness, which transfers the copies to a second downly moving conveyor belt, passing a counting station with a preselector which transmits pulses to a stacking installation. The latter has stack-bearing arms led by rollers into a vertical endless belt having guide rails and passing through guided stop devices. Arrest means are provided for the roller cages, operationally coupled to the stop devices.

2 Claims, 3 Drawing Figures

Patented March 21, 1972　3,650,372

MACHINE FOR AUTOMATICALLY STACKING JOURNALS COUNTED IN PREVIOUSLY SELECTED NUMBERS

The present invention relates to a machine for automatically stacking journals counted in previously selected numbers, the stacks being intended to be transformed into packets for their dispatch.

A machine of this type is to be found in the trade. In this machine the stack-bearing arms are rigidly fixed to movable chains and thus for more or less thick stacks, the distances between the stack-bearing arms must be altered, which is expensive and time-consuming.

It is an object of the present invention to eliminate these drawbacks.

The machine according to the invention is characterized by the fact that a first horizontal conveyor belt presses all the copies which are delivered to it stacked or in series by the rotary press, at the fold to the same thickness and straightened laterally, so that the copies are transmitted to a second conveyor belt directed downwardly, whereby the copies on passing to the second conveyor belt pass through a counting station previously programmed, which transmits pulses to a stacking installation bearing stack-bearing arms, said arms being brought by means of rollers to a vertical endless band, equipped with guide rails and passing through oriented stop devices, stop means being provided for the roller housings of the stack-bearing arms in operational relationship with the stop devices.

In order that the invention may be more fully understood, one embodiment of the machine according to the invention is described below, purely by way of illustrative and non-limiting example, with reference to the accompanying drawing, in which.

Figure 1:
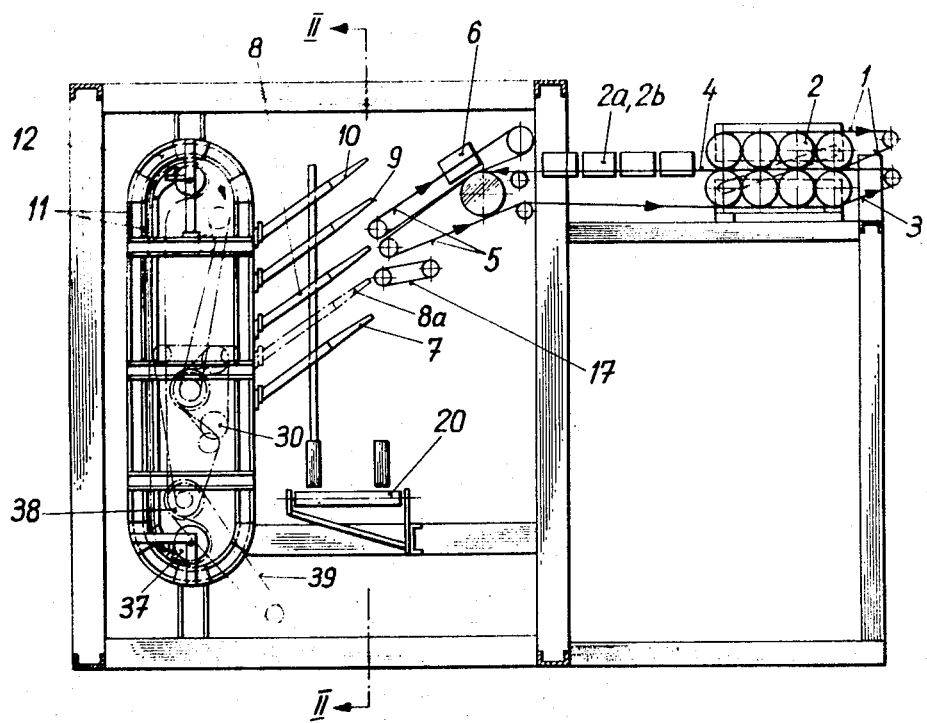
FIG. 1 shows a diagram of said embodiment.
Figure 2:
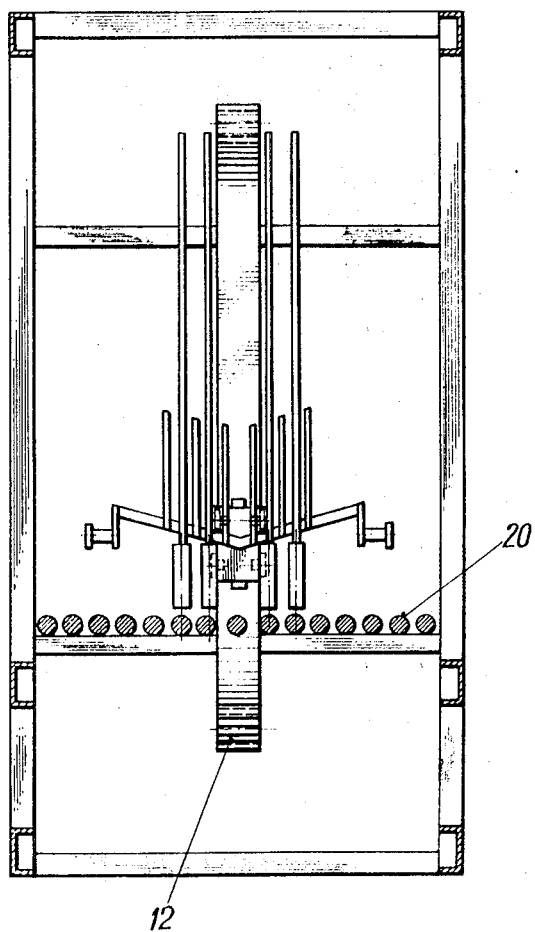
FIG. 2 shows a cross section through the line II—II of the embodiment of FIG. 1.
Figure 3:
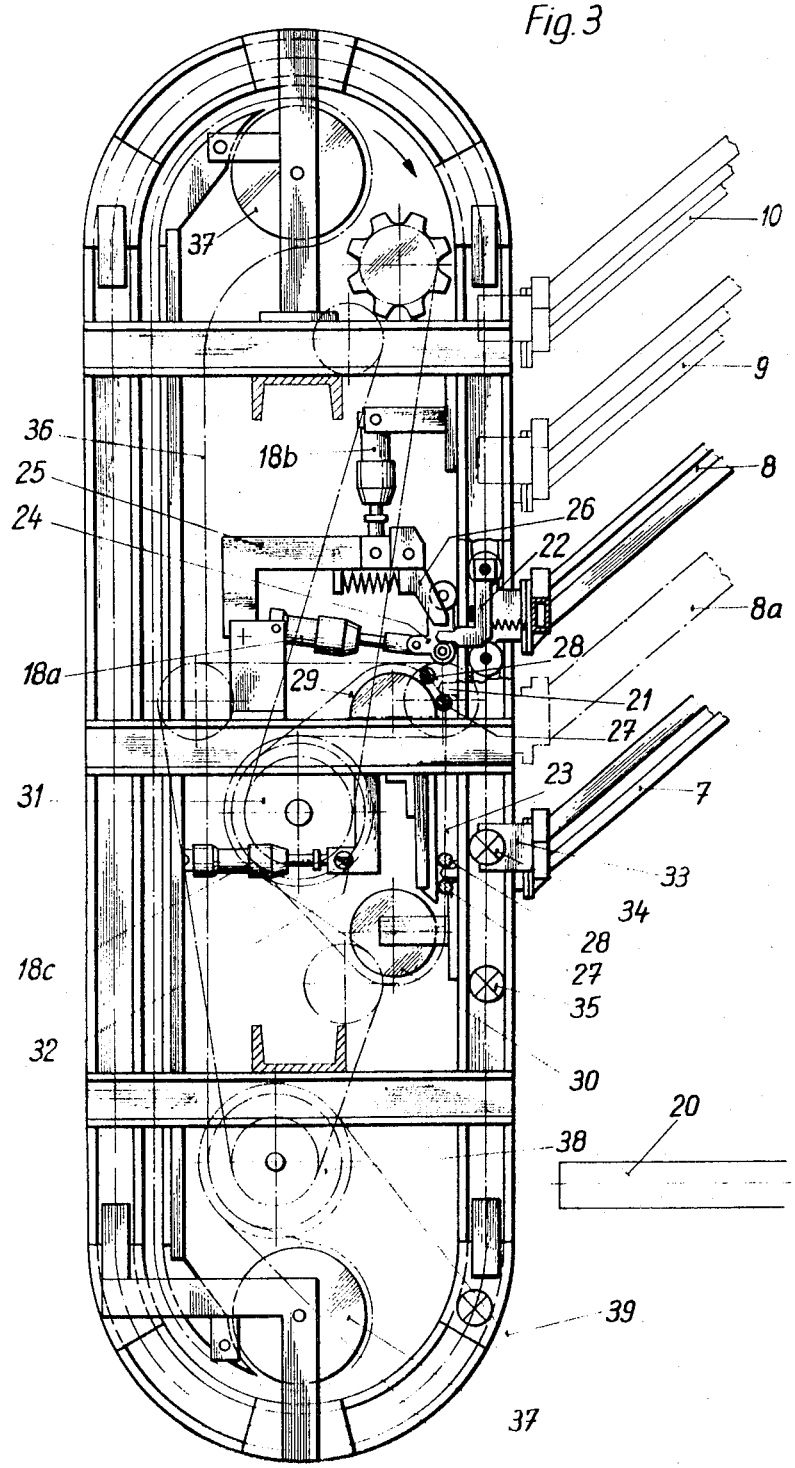
FIG. 3 shows a partial diagram in detail of the counting device.

In the drawing, a frame of sectional iron members supports a first horizontal conveyor belt 1-4, with a pressing and straightening installation 2a,2b, a second conveyor belt 5, a counting device 6 with a pulse source and preselection counter, as well as a stacking device 7-39 and roller transporter 20 for the removal of the stacks of journals.

The first conveyor belt 1-4 receives the journals which have been transmitted stacked or in sequence from the rotary press by the conveyor belts 1. By means of the fixed rollers 2 and the flexible rollers 3, which press on the belts 1, all the journals are pressed on guides to the same thickness. The rollers 2a and 2b arranged laterally and rotatable opposite each other on vertical axes, cause a laterally reassembly of the copies.

The second conveyor belt 5 stands in cooperating relationship with the first conveyor belt 1-4, the belt 5 being directed downwardly and carrying the journals to the stack-bearing arms 8. The second conveyor belt 5 is provided with a counting station 6, electronically or electromechanically preselectable, by means of which the desired number of copies per stack can be fixed in advance. After the passage of the previously selected number of journals of the stack, the counting station 6 supplies at the given moment a pulse to the stacking installation, which is provided with stack-bearing arms 7-10.

Below the conveyor belt 5 there is arranged a smaller conveyor belt 17, which ensures the arrival of the journals in the correct stack-bearing arms.

The stack-bearing 7-10 are provided with pairs of rollers which are moved between the guide rails 11 of the endless, closed vertical belt 12 through oriented stop devices.

The first upper stop device halts the empty stack-bearing arms 8, 9, 10, a little beyond the end of the journal conveyor belt 5 (FIG. 1), so as to allow the journals from this belt to arrive in the stack-bearing arm 7, positioned below, until the latter is filled with the preselected number of journals. The arm 9, by reason of its weight, has its roller cage closed over the roller cage of the arm 8. In the same way, the roller cage of the arm 10 is positioned over that of the arm 9. On the roller cage of each arm 7-10 is fixed a sprung rocking lever 22, provided with a stop catch 21.

The upper stop device is provided with an oscillating locking lever 24, fixed to the guide rail 11 and provided with a cam, which is actuated by a guided drive shaft 18a. To stop the stack-bearing arm 8, the drive 18a tilts the locking lever 24 against the rail 11 so as to bring the stop catch 21 of the arm 8 on the cam of the locking lever 24. A sprung acceleration pawl 26 fixed to the angle lever 25 in oscillating manner is engaged on the arrest of the arm 8 and is positioned on the catch 21 of the angle lever. The rocking lever 25 is in operational cooperation with the drive shaft 18b.

The lower stop device is provided with a bolt chain 23, which is coupled to the drive wheel 31 and is brought into the field of movement of the stop catches 21 of the stack-bearing arms 7-10 by wheels 29, 30 along the rail 11. By a locking lever 32 which is operationally coupled to a drive shaft 18c, the free wheel clutch to the wheel 31 can be declutched and thereby the bolt chain can be stopped. The distance between bolts of the chain 23 is so dimensioned that the stop catch 21 is held between two consecutive bolts 27, 28 of the chain, so that the stack-bearing arm 7 hangs on the chain 23 which has a slow downward movement.

As soon as the preselected number of copies is counted from the conveyor belt 5 for the stack-bearing arm 7, a pulse is emitted by the counting station 6, which is retarded proportionally to the speed and corrected to correspond thereto, on the drive 18a, which tilts the locking lever 24 and frees the stop catch 21 downward so that the arm 8 can move downward under its own weight. The drive 18b simultaneously receives an impulse so that the angle lever presses the acceleration pawl 26 downward on to the stop catch 21 of the arm 8, whereby the latter receives a downward accelerating thrust. The stop catch 21 of the arm 8 is stopped by the bolt 27 of the chain 23, so that the arm is stopped just under the conveyor belt 5. A delayed impulse causes the disengagement by the drive 18c of the locking lever 32 at the free wheel coupling and in this way the chain wheel 31 and the chain 23 are left in free movement. By its own weight the arm 7 is displaced downward with its stop catch 21 and outside of the chain 23. At the same time the arm 8 is also displaced by its won weight, with its stop catch downward in the chain 23 to the slit-initiator 34. The latter causes by means of the drive 18c the immediate arrest of the free movement of the chain 23 and through the stop catch 21 arrest of the falling movement of the arm 8, so that another batch of copies can be counted and stacked. The stack-bearing arm 7 passes by the slit-initiator 35 and places the stack on the roller conveyor 20, positioned at right angles with respect to the conveyor belt 12 of the arms, the arms passing between the rollers. The slit-initiator 35 then causes the lifting of the stacks and positions them on the roller conveyor 20 freeing another place for the next stack.

After deposition of the stack of journals on the roller conveyor 20, the stack-bearing arms fall downward in the belt 12 and are then carried upward again by a chain 36, to fall again by their own weight into the position of the arm 10 (FIG. 1).

The actuation of the drive chain 36 and of the deflecting rollers 37 is effected by the chain 39 over the chain wheel 38.

I claim:

1. Machine for automatically stacking copies of journals in preselected numbers with the piles obtained being destined to form packets for delivery comprising a horizontal transporting means capable of receiving said journals and pressing and laterally aligning said journals, a downwardly inclined transporting means and positioned for receiving said journals delivered thereto by said horizontal transporting means, a counter positioned at said downwardly inclined transporting means, a stacking device having vertical guide rails, rollers in said guide rails, stack-bearing arms connected to separate groups of said rollers and extending from said guide rails in a direction for receiving journals from said downwardly inclined transporting means in turn, an upper stop device mounted on said stacking device having an oscillatable locking lever on said rail and an acceleration pawl, a plurality of stop catches each pivotally carried by one of said arms, resilient means tending to move each of said stop catches beyond said rail, means capable of moving said locking lever into stopping engagement and out of engagement with each of said stop catches in turn, means capable of operating said pawl into engagement with each stop catch as released by said locking lever and pushing the attached stack-bearing arm and means controlled by said counter capable of moving said lock-lever to its released position and said pawl into engagement with the released stop catch when a preselected number of journals is fed onto said attached stack-bearing arm whereby said arm moves downward.

2. Machine as claimed in claim 1 including a lower stop device mounted on said stacking device and having a driven endless bolt chain which has a section positioned alongside said guide rail for receiving each stop catch passing therealong, between two successive chain bolts, for retarding the downward movement of the attached arm and means for at times stopping said chain.

* * * * *